United States Patent [19]

Rumsa

[11] Patent Number: 4,478,101

[45] Date of Patent: Oct. 23, 1984

[54] MECHANICAL TRANSMISSION APPARATUS

[76] Inventor: Antanas J. Rumsa, 3142 W. 42nd Pl.; Chicago, Ill. 60632

[21] Appl. No.: 489,720

[22] Filed: Apr. 29, 1983

Related U.S. Application Data

[63] Continuation of Ser. No. 174,083, Jul. 31, 1980, abandoned, which is a continuation of Ser. No. 875,962, Feb. 8, 1978, abandoned.

[51] Int. Cl.³ .......................... F16H 3/08; F16H 1/06; F16H 1/12; F16H 3/22
[52] U.S. Cl. ........................................ 74/325; 74/413; 74/421 R; 74/342
[58] Field of Search ................. 74/740, 331, 341, 342, 74/356, 357, 359, 363, 369, 375, 694, 701, 325, 413, 421 R

[56] References Cited

U.S. PATENT DOCUMENTS

| | | | |
|---|---|---|---|
| 760,218 | 5/1904 | Lefinski | 74/357 |
| 1,192,277 | 7/1916 | Daimler | 74/701 |
| 1,425,002 | 8/1922 | Garelli | 74/342 |
| 1,473,459 | 11/1923 | Bottinelli | 74/342 X |
| 1,512,921 | 10/1924 | Garlick | 74/342 |
| 2,517,769 | 8/1950 | Debuit | 74/745 |
| 2,911,841 | 11/1959 | Miller | 74/342 |
| 3,084,563 | 4/1963 | Fischer | 74/363 X |
| 3,095,759 | 7/1963 | Herrod | 74/701 |
| 3,159,044 | 12/1964 | Feuillastre | 74/342 |
| 3,706,363 | 12/1972 | Niles | 74/194 X |
| 3,859,870 | 1/1975 | Whately | 74/331 |
| 4,103,566 | 8/1978 | Von Kaler et al. | 74/701 |
| 4,232,569 | 11/1980 | Hauser et al. | 74/701 |

FOREIGN PATENT DOCUMENTS

| | | | |
|---|---|---|---|
| 160768 | 5/1904 | Fed. Rep. of Germany | 74/341 |
| 477840 | 5/1929 | Fed. Rep. of Germany | 74/342 |
| 477839 | 5/1929 | Fed. Rep. of Germany | 74/342 |
| 680405 | 1/1930 | France | 74/342 |
| 561585 | 4/1957 | Italy | 74/341 |
| 149244 | 3/1955 | Sweden | 74/342 |

*Primary Examiner*—Allan D. Herrmann
*Assistant Examiner*—Bruce F. Wojciechowski
*Attorney, Agent, or Firm*—Bernard L. Kleinke

[57] ABSTRACT

Mechanical transmission apparatus having a pair of first and second shafts mounted in a housing, and a gear train mounted thereon. A first small gear mounted on the first shaft meshes with a second large gear mounted on the second shaft. A third small gear mounted on the second shaft is fixedly connected to the second gear and meshes with a fourth large gear mounted on the first shaft. Each one of the large gears has substantially the same number of teeth and each one of the small gears has substantially the same number of teeth. A source of power is coupled to the gear train, and one of the first and second shafts is coupled drivingly to a load. One of the gears of the gear train is fixed to its one of the first and second shafts, whereby power is transmitted from the source through the gear train to the load. The gear train includes a first set of axially aligned gears arranged in pairs of fixedly connected together gears, and a second set of axially aligned gears arranged in pairs of fixedly connected together gears. Each pair of the first set intermeshes with a corresponding one of the pairs of the second set of axially aligned gears, whereby the second and third gears are one of the pairs of fixedly connected together gears of one of the first and second sets of gears, and the fourth and fifth gears are one of the pairs of fixedly together gears of the other one of the first and second sets of gears.

7 Claims, 5 Drawing Figures

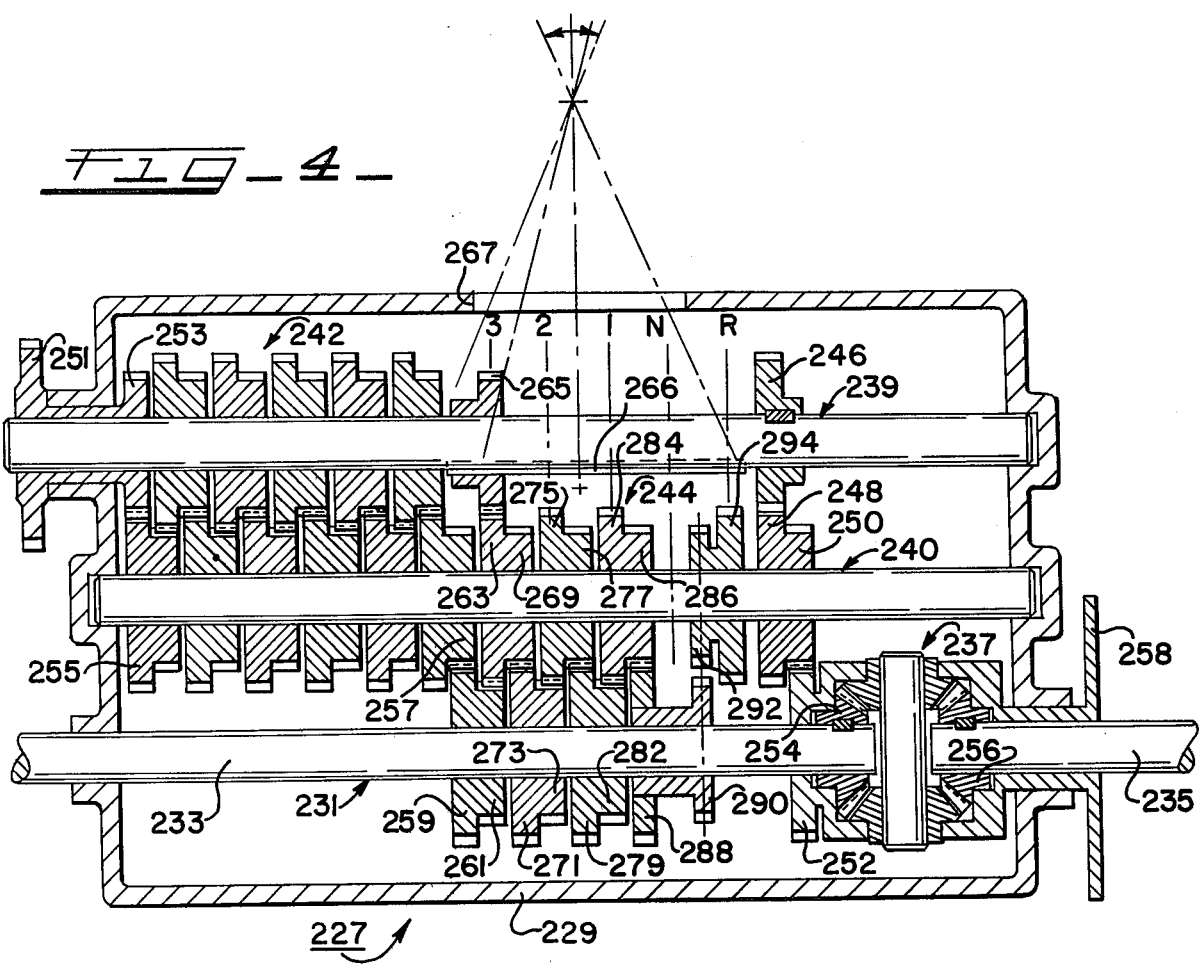
FIG_4_
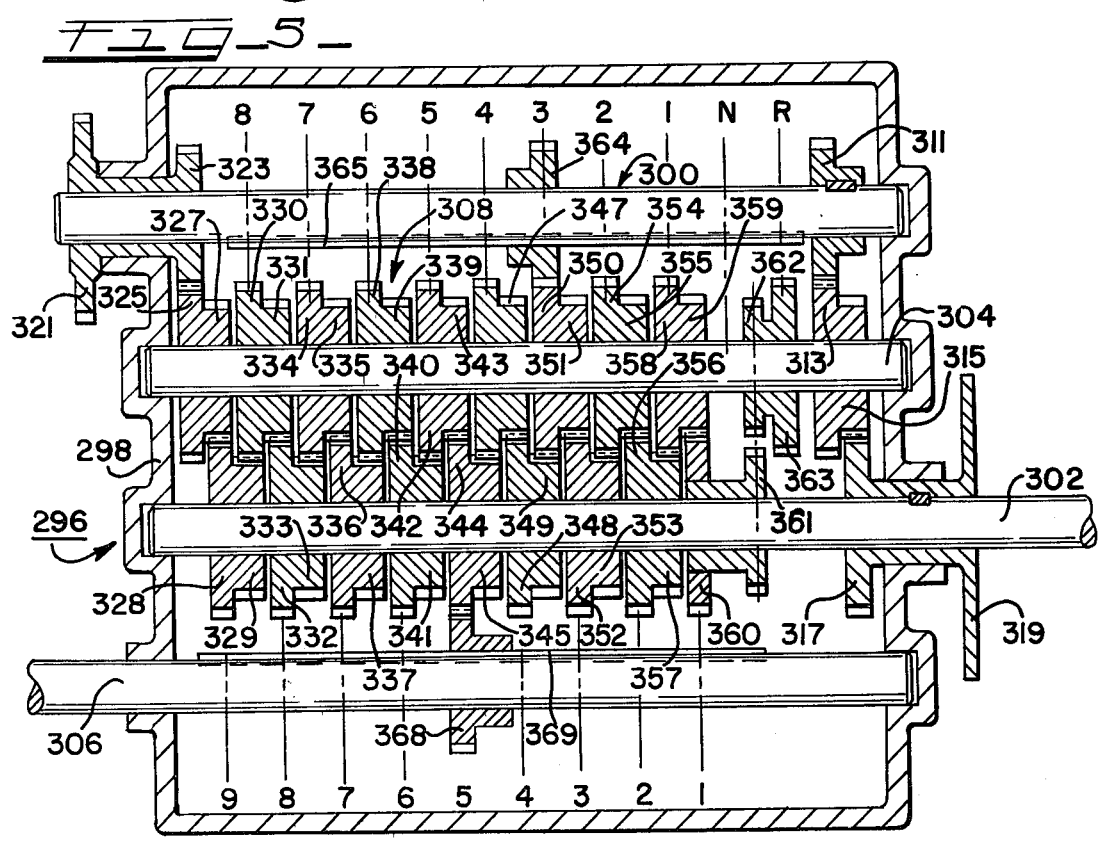
FIG_5_

MECHANICAL TRANSMISSION APPARATUS

This is a continuation of application Ser. No. 174,083, filed July 31,1980, now abandoned which application was a continuation of parent application Ser. No. 875,962, filed Feb. 8, 1978 now abandonded.

BRIEF SUMMARY OF THE INVENTION

The present invention relates in general to mechanical transmission apparatus, and more particularly relates to a mechanical gear transmission, which drivingly couples a source of mechanical power to a load.

Many different types and kinds of mechanical gear transmissions have been known in the prior art. For example, reduction gear transmissions have been employed for many different applications. When a number of reduction gears are required in such a mechanical gear transmission, a series or train of gears mounted on a series of separate shafts enable a torque multiplication or speed change, whichever is desired, to result between the input gear and the output gear. For example, a large gear may be fixed to a smaller gear mounted on the same shaft, and the smaller gear meshes with a larger gear rotatably mounted on a second shaft and fixed to another smaller gear on the second shaft so that the second smaller gear can similarly mesh with a third larger gear on a third shaft, whereby a series of pairs of gears each mounted on a separate shaft forms a gear train. While such a gear train may be satisfactory for some mechanical gear transmissions, it would be highly desirable to have a more compact mechanical gear transmission, which is less expensive to manufacture. Moreover, such a mechanical gear transmission should be flexible in design so that the same gear transmission can be used for several different applications. Additionally, such a mechanical gear transmission should be designed to incorporate a speed shifting arrangement. Therefore, it is the principal object of the present invention to provide a new and improved mechanical transmission apparatus, which is relatively less expensive to manufacture, and which is compact in size.

Another object of the present invention is to provide such a new and improved mechanical transmission apparatus, which is adapted to embody speed changing arrangements, and which is flexible in design so as to enable it to accommodate various different types and kinds of applications.

Briefly, the above and further objects of the present invention are realized by providing a mechanical transmission apparatus, which includes a gear train including a plurality of gears which include a first small gear mounted on a first shaft, and a second large gear mounted on a second shaft for meshing with the first gear. A third small gear is mounted on the second shaft and fixedly connected to the second large gear. A fourth large gear is mounted on the first shaft for meshing with the third gear. A fifth small gear is mounted on the first shaft and fixedly connected to the fourth gear. Each one of the large gears has substantially the same number of teeth and each one of the small gears has substantially the same number of teeth. A source of mechanical power is adapted to be coupled to the gear train, and a load is adapted to be drivingly coupled to one of the first and second shafts. At least one of the gears of the gear train is fixed to its one of the first and second shafts whereby power is transmitted from the source through the gear train to the load. The gear train includes a first set of axially aligned gears arranged in pairs of fixedly connected together gears, and a second set of axially aligned gears are arranged in pairs of fixedly connected together gears. Each pair of the first set intermeshes with a corresponding one of the pairs of the second set of axially aligned gears. The second and third gears are one of the pairs of fixedly connected together gears of one of the first and second sets of gears, and the fourth and fifth gears are one of the pairs of fixedly connected together gears of the other one of the first and second sets of gears.

As a result, the mechanical transmission apparatus of the present invention can be mounted on two shafts only regardless of the number of stages of gears, thereby enabling the overall size of the unit to be substantially smaller, less expensive and more compact than a similar conventional gear transmission unit. In this regard, by employing only two shafts, there is an overall cost savings in reducing the number of shafts needed for the transmission, and the overall size of the housing for the unit would be smaller and thus less expensive to manufacture. Moreover, the apparatus of the present invention may employ a series of identical size gears so that the initial tooling cost for the device would be much less expensive than the tooling cost required for a conventional mechanical gear transmission employing many different sizes of gears. By employing a series of pairs of gears mounted on two shafts in accordance with the present invention, a highly efficient and flexible unit results in that power may be taken off of any one of a number of gears in a convenient manner, and a speed changing arrangement may be readily employed as hereinafter described in greater detail.

The above, and still further highly important objects and advantages of the invention will become apparent from the following detailed specification, appended claims and the attached drawings, wherein:

FIG. 4 is a vertical cross-sectional view of yet another mechanical transmission apparatus, which is constructed in accordance with the present invention; and FIG. 5 is a vertical cross-sectional view of a further mechanical transmission apparatus, which is constructed in accordance with the present invention.

Figure 1:
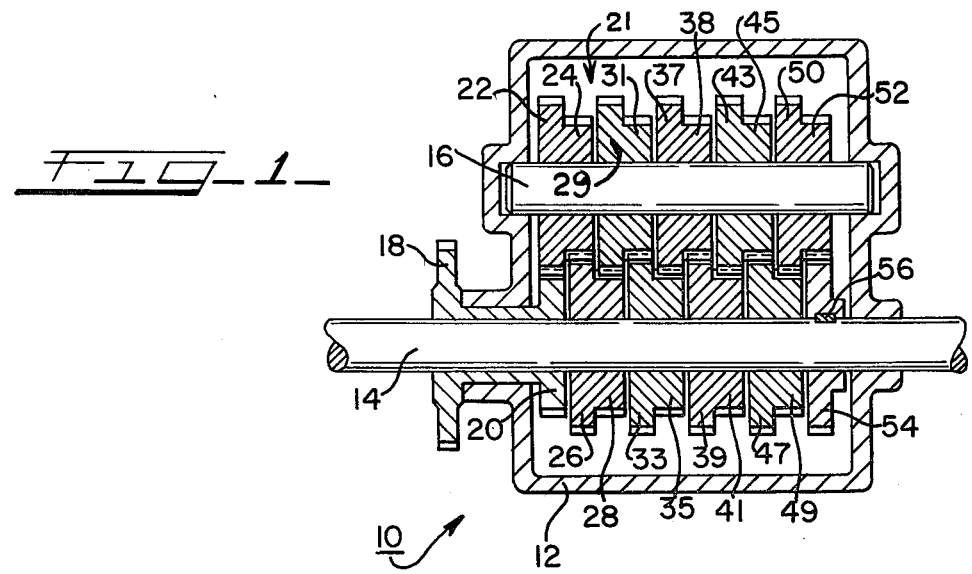
FIG. 1 is a vertical cross-sectional view of mechanical transmission apparatus, which is constructed in accordance with the present invention.

Referring now to FIG. 1, there is shown a mechanical transmission apparatus 10, which is constructed in accordance with the present invention. The transmission apparatus 10 includes a housing 12 having an output shaft 14 journaled for rotation therein, the output shaft 14 being adapted to be coupled drivingly to a load (not shown). A second shaft 16 is journaled fixedly within the housing 12 and extends in a parallel spaced-apart manner relative to the output shaft 14. A large outside input gear 18 or other such input device, such as a sprocket, friction wheel or the like, is freely mounted on the outer portion of the input shaft 14 on the outside of the housing 12, and the gear 18 is fixed to a gear 20 of a gear train generally indicated at 21 mounted on the shafts 14 and 16 as hereinafter described in greater detail.

The gear train 21 includes the small gear 20 which is integral with the outside input gear 18 and is mounted for free rotation about the output shaft 14. A large gear 22 is mounted for free rotation on the shaft 16 and meshes with the small gear 20. A small gear or pinion gear 24 is fixed to or integral with the large gear 22 and is mounted for free rotation about the shaft 16. A large gear 26 is mounted for free rotation about the output shaft 14 and meshes with the small pinion gear 24. A small gear or pinion gear 28 is fixed to or integral with the large gear 26 and is mounted for free rotation on the output shaft 14. A large gear 29 is mounted freely on the shaft 16 and engaged meshingly with the pinion gear 28 and is integrally connected to a small or pinion gear 31 which is also mounted freely on the shaft 16. A large gear 33 is mounted freely on the output shaft 14 and meshes with the small gear 31. A small or pinion gear 35 is integral with the gear 33 and is mounted freely on the output shaft 14 to mesh with a large gear 37 mounted freely on the shaft 16. A small or pinion gear 38 is integral with the large gear 37 and meshes with another large gear 39 mounted freely on the output shaft 14. A small or pinion gear 41 is fixed to or integral with the large gear 39 and freely surrounds the output shaft 14 for meshing with a large gear 43 mounted freely on the shaft 16.

A small or pinion gear 45 is integral with the large gear 43 and freely surrounds the shaft 16 to mesh with a large gear 47 which surrounds freely the output shaft 14. A smaller pinion gear 49 is fixed to or integral with the large gear 47 and freely surrounds the output shaft 14 for meshing with a large gear 50 which in turn is mounted freely for rotation on the shaft 16. A small integral gear 52 is mounted freely on the shaft 16 to mesh with a large gear 54 which is fixed by means of a pin 56 to the output shaft 14 for driving it.

Thus, the gear train 21 includes a first set of axially aligned gears mounted on the output shaft 14 and arranged in pairs of fixedly connected together gears, such as the gears 26 and 28. A second set of axially aligned gears are mounted on the shaft 16 and are arranged in pairs of fixedly connected together gears, such as the gears 29 and 31. Each pair of the first set of gears intermeshes with a corresponding one of the pairs of the second set of axially aligned gears. A source of power (not shown) is coupled to the first gear (gear 20) of the gear train 21, and a load (not shown) is adapted to be coupled to the output shaft 14. Since the gear 54 is fixed to the output shaft 14, the gear train 21 produces a gear reduction or speed change from the input gear 20 to the output gear 54, while employing only two shafts—output shaft 14 and the shaft 16. Such a transmission apparatus 10 is very compact in size since only two shafts are employed. Additionally, each one of the large gears, such as the gear 22 and the gear 26, has substantially the same number of teeth, and each one of the small gears, such as the gears 24 and 28 has substantially the same number of teeth. As a result, the gear pinion pairs are all identical to one another so that the apparatus 10 can be manufactured in an economical manner. In this regard, the tooling expenses would be greatly minimized since each one of the gears of the gear train 21 is identical. Moreover, only two shafts are employed and a relatively small size housing is required. As hereinafter described in greater detail, speed changes can be readily and conveniently employed in connection with the apparatus of the present invention, and the apparatus of the present invention is very flexible since it is readily adaptable for many different types and kinds of applications as will become clearly understood as hereinafter described in greater detail.

In use, the source of power (not shown) is coupled to the small gear 20 of the gear train 21 by means of the large outside input gear 18 or the like input device so as to drive the gears in the gear train 21, each one of the gears being freely rotatable about the shafts 14 and 16 except the last large gear 54 which is fixed to the output shaft 14 for driving it at a greatly reduced speed relative to the input gear 20.

Figure 2:
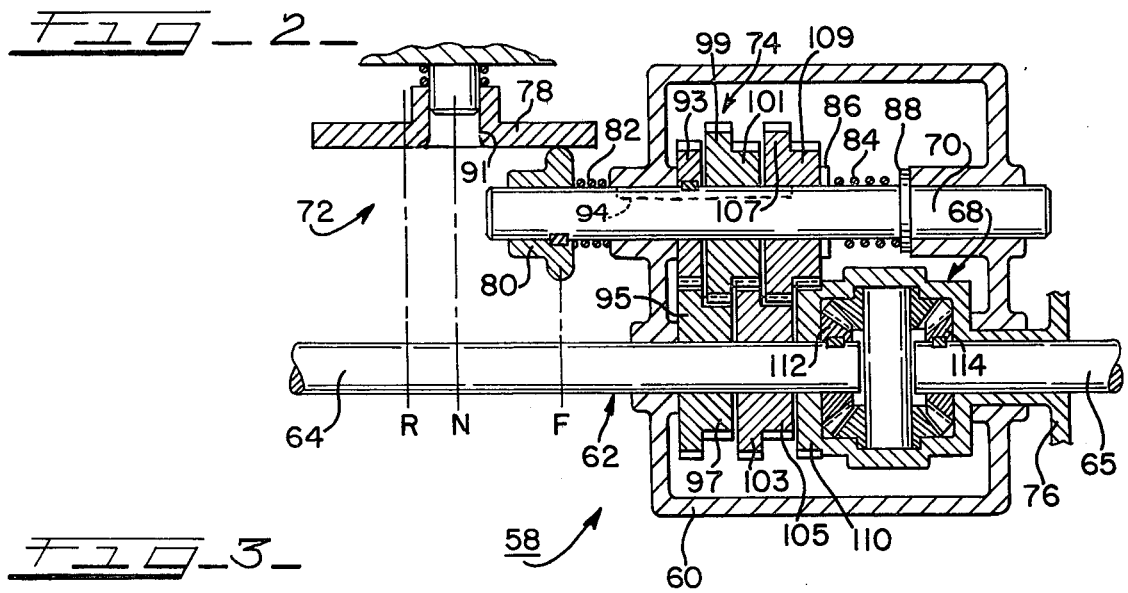
FIG. 2 is a vertical cross-sectional view of another mechanical transmission apparatus, which is constructed in accordance with the present invention.

Referring now to FIG. 2 of the drawings, there is shown a transmission apparatus 58, which is constructed in accordance with the present invention, and which is similar to the transmission apparatus 10 of FIG. 1 except that the apparatus 58 is in the form of a transaxial adapted to be used on a small vehicle. It should be understood that while the transmission apparatus 58 may be employed in connection with small vehicles, the apparatus 58 may be employed with other types and kinds of vehicles as well. Additionally, it is to be understood by those skilled in the art that the mechanical transmission apparatus of the present invention may be employed with many different types and kinds of applications for its use as will become apparent to those skilled in the art.

The transmission 58 generally comprises a housing 60 in which is mounted a transaxial 62 having a left shaft 64 extending from one side thereof and a right shaft 65 extending from the opposite side thereof, the left and right shafts being joined together by a differential 68. An input shaft 70 is journaled for rotation within the housing 60 and is connected to a variable input friction drive 72 which in turn may be driven by a suitable source of power, such as a single cylinder engine. A fixed reduction gear train 74 is mounted on the shafts 64 and 70 which extend parallel to one another, the gear train 74 including a series of fixed-together large and small gears in a similar manner as the gear train 21 of the apparatus 10 as hereinafter described in greater detail. A brake member 76 is fixed to the differential housing and cooperates with another brake member (not shown) for braking purposes.

Considering now the variable input friction drive 72 in greater detail, the drive 72 includes a spring loaded friction plate 78 which is driven by the engine (not shown), and in turn drives an input drive roller 80 fixed to the input shaft 70 which extends axially in a direction at right angles to the axis of rotation of the friction plate 78. A forward compression spring 82 surrounds the input shaft 70 between the roller 80 and the outside of the housing 60 to urge resiliently the shaft 70 to cause it to shift axially until the roller 80 is aligned centrally with the plate 78 in a neutral position as hereinafter described in greater detail. Similarly, a reverse compression spring 84 (shown in a relaxed condition), surrounds the input shaft 70 within the housing 60 between a pair of stops 86 and 88 so as to urge resiliently or otherwise bias the input shaft 70 so as to shift it axially from a reverse drive position to the left of the neutral central position of the plate 78 as indicated by the phantom line designated as R on the drawings. At the neutral central position, a central opening 91 in the plate 78 receives the roller 80 which is biased to that position by both the forward spring 82 and the reverse spring 84. A handle (not shown) or other such suitable device shifts the shaft 70 axially to either the left or right of the center neutral position for either driving the output in either a forward or a reverse direction. In this regard, when the roller 80 is disposed in the central or neutral position designated by the letter N, the roller 80 fits within the central opening 91 in the plate 78 and thus is not driven by the plate 78. When the shaft 70 is shifted rightwardly axially to the position as shown in FIG. 2 of the drawings, the shaft 70 rotates in a forward direction and the return spring 82 is compressed. When the shaft 70 is released, the return spring 82 urges the roller 80 to the central opening 91 for an automatic return-to-neutral operation. Similarly, when the shaft 70 is shifted leftwardly axially until the roller 80 engages the left portion of the plate 78 in the reverse position indicated by the letter R in the drawings, the plate 78 drives the roller 80 and thus the shaft 70 in a reverse direction. In such a position, the reverse return spring 84 is compressed so that when the shaft 70 is released, the spring 84 snaps the shaft 70 rightwardly until the roller 80 fits into the central opening 91 of the plate 78 in the neutral position.

Considering now the gear train 74 in greater detail, a small gear 93 is pinned to the shaft 70 within an axially-extending groove 94 and rotates therewith when the drive roller 80 rotates the shaft 70 about its axis, whereby the gear 93 is fixed rotationally to the shaft 70 for rotating in unison therewith, but the gear 93 is free to slide transversely relative to the shaft 70 with the groove 94 to enable the shaft 70 to be shifted laterally either rightwardly or leftwardly. A large gear 95 is mounted freely for rotation about the left shaft 64 and meshes with the smaller gear 93. A small or pinion gear 97 is integral with or fixed to the large gear 95 and freely surrounds the shaft 64. A large gear 99 freely surrounds the shaft 70 and meshes with the small gear 97. A small or pinion gear 101 is integral with the large gear 99 and freely surrounds the shaft 70 to mesh with a large gear 103 which in turn is integral with a small or pinion gear 105 both freely surrounding the shaft 64. A large gear 107 freely surrounding the shaft 70 meshes with the small gear 105 and is integral with a small or pinion gear 109 meshing with a gear housing 110 of the differential 68 joining the two shafts 64 and 65 in coaxial alignment. In this regard, a pair of internal bevel gears 112 and 114 of the differential 68 are pinned to the respective shafts 64 and 65 to form the transaxial 62. It should be understood that the differential 68 is a conventional differential as is well known in the art.

In use, with the variable input friction drive 72 in its neutral position with the roller 80 disposed in the central opening 91, the plate 78 is driven about its central axis but the shaft 70 remains stationary. In order to couple mechanical energy to the load, the shaft 70 is shifted rightwardly by means of a handle (not shown) until the roller 80 is disposed in the forward F position as shown in FIG. 2 of the drawings wherein the roller 80 engages the right side of the plate 78 to cause the shaft 70 to rotate about its axis. In so doing, the fixed reduction gear train 74 transmits power from the input shaft 70 to the gear 93 and from there through the gear 95 back to the gear 99 and its small gear 101 to the large gear 103 and thus the small gear 105 to the gears 107 and 109 to in turn drive the gear housing 110 of the differential 68, whereby the shafts 64 and 65 are driven about their axis. Should the handle (not shown) for the shaft 70 be released, the return spring 82 shifts the shaft 70 leftwardly as viewed in FIG. 2 of the drawings until the roller 70 returns to its neutral position N with the roller 70 being disposed in the central opening 91 to prevent power from being transmitted from the input friction drive 72 to the shafts 64 and 65. By shifting the shaft 70 leftwardly to the reverse R position, the shaft 70 rotates in an opposite direction and thus the output shafts 64 and 65 rotate in a reverse or opposite direction. The return spring 84 then enables the shaft 70 to return leftwardly back to the neutral position.

Figure 3:
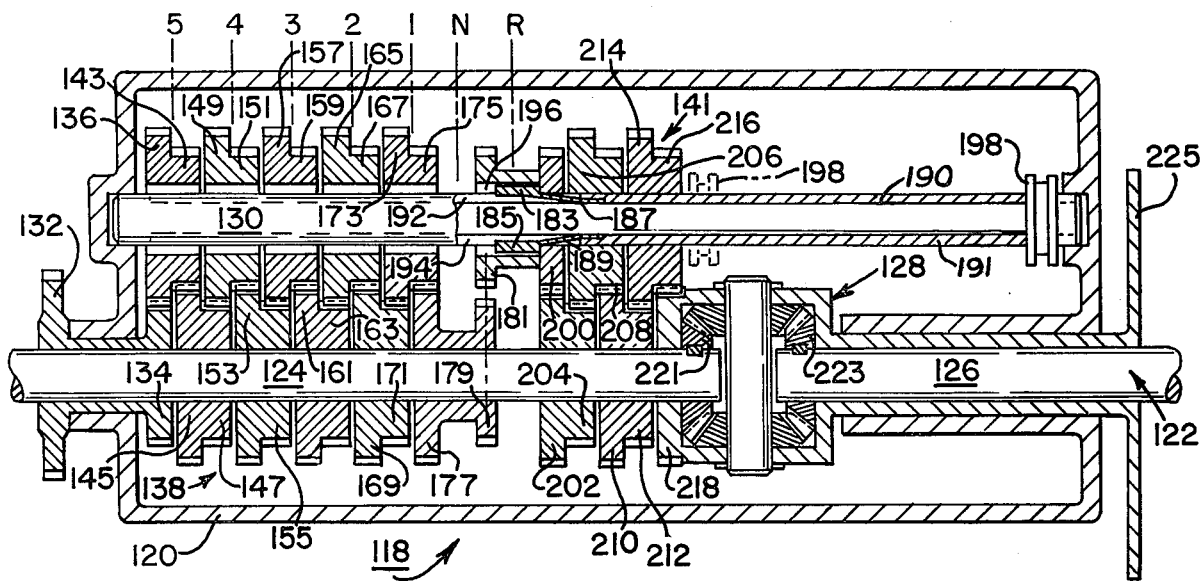
FIG. 3 is a vertical cross-sectional view of still another mechanical transmission apparatus which is constructed in accordance with the present invention.

Referring now to FIG. 3 of the drawings, there is shown a mechanical transmission apparatus 118 which is constructed in accordance with the present invention and which is similar to the transmission apparatus 58 of FIG. 2 with the addition of a gear shifting arrangement. The transmission 118 generally comprises a housing 120 through which extends a transaxial generally indicated at 122 comprising a left shaft 124 and a right shaft 126 joined together in axial alignment with one another by means of a differential 128. A gear shift shaft 130 is mounted for rotation within the housing 120 and extends in a parallel spaced-apart direction relative to the transaxial 122 similarly mounted for rotation within the housing 120.

A large outside input gear 132 or the like input device is freely mounted for rotation on the shaft 124 outside of the housing 120, and a small inside input gear 134 is also mounted for free rotation about the shaft 124 within the interior of the housing 120 and is fixedly connected integrally to the outside input gear 132 for driving a large gear 136 of a forward shifting range gear train 138 which in turn drives a fixed reduction gear train 141 which is similar to the gear train 74 of FIG. 2. In this regard, both of the gear trains 138 and 141 include a series of gears comprising a first set of axially aligned gears arranged in pairs of fixedly connected together gears and a second set of axially aligned gears arranged in pairs of fixedly connected together gears such that each pair of the first set of gears intermeshes with a corresponding one of the pairs of the second set of axially aligned gears. The first set of axially aligned gears are mounted on the shaft 124 and the second set of gears are mounted on the shaft 130.

Considering now the forward shifting range gear train 138 in greater detail with reference to the drawings, a small or pinion gear 143 is integrally connected to the large gear 136 and freely surrounds the shaft 130 to engage a large gear 145 freely surrounding the shaft 124. A small or pinion gear 147 is fixed to in an integral manner the gear 145 and freely surrounds the shaft 124 to engage meshingly the large gear 149 mounted freely on the shaft 130. A small or pinion gear 151 integral with the large gear 149 freely mounted on the shaft 130 engages meshingly a large gear 153 freely mounted on the shaft 124 and fixed integrally with a small or pinion gear 155 also freely mounted on the shaft 124. A large gear 157 freely mounted on the shaft 130 meshes with the gear 155 and is integral with a small or pinion gear 159 meshing with a large gear 161 mounted freely on the shaft 124. A small or pinion gear 163 integral with the large gear 161 is freely mounted on the shaft 124 and meshes with a large gear 165 which is integral with a small or pinion gear 167 freely mounted on the shaft 130 to mesh with a large gear 169 on the shaft 124. Similarly, a small or pinion gear 171 integral with the gear 169 freely rotates about the shaft 124 and meshes with a large gear 173 freely mounted on the shaft 130 and integral with a small or pinion gear 175 meshing with a large gear 177 freely mounted on the shaft 124. A sprocket 179 is integrally connected to the large gear 177 and is connected by a chain (not shown) or other suitable device to another sprocket 181 or a set of three gears including an idler gear (not shown) to form a reverse gear arrangement for the transmission apparatus 118.

In this regard, a pair of slidable keys 183 and 185 are urged resiliently radially outwardly by means of a pair of respective springs 187 and 189 attached at one of their ends to the respective keys 183 and 185 and at their other ends to a pair of respective transversly slidable elongated keys 190 and 191 within a pair of diametrically opposed keyways 192 and 194 in the shaft 139. As a result, the keys 183 and 185 are adapted to engage selective ones of the gears 136 through 181 mounted on the shaft 130. A shifter ring 198 attached to the elongated keys rotates with the shaft 130 and moves the elongated keys by means (not shown) to the left as viewed in FIG. 3 of the drawings until the keys 183 and 185 are disposed opposite a selected gear so that the keys 183 and 185 snap into engagement with the keyway slots in the selected gear, such as the keyway slot 196 of the sprocket 181. In this regard, any one of the gears mounted on the shaft 130 from the gear 136 to the sprocket 181 may be fixed to the shaft 130 by means of the slidable keys 183 and 185 by moving the shifter ring 198 between the position of the ring 198 shown in solid lines to its leftwardmost position shown in phantom lines, the latter position being the position in which the keys 183 and 185 snap into engagement with the integral gears 136 and 143.

It should be understood that the shifter ring may be moved in a manual operation, or it may be moved mechanically by various different types and kinds of devices, such as piston cylinder assemblies or the like.

Thus, by employing the gear shifter shaft 130 with the slidable keys 183 and 185, various different speeds for the transmission 118 may be selected. In this regard, the apparatus 118 shown in FIG. 3 of the drawings is a five forward speed unit as designated in FIG. 3. In this regard, there are five pairs of fixedly connected together gears mounted on the shaft 130, each one of which providing a separate speed for the transmission apparatus 118, the first speed being the gears 134 through 173 and the last speed being provided by gears 134 and 136. A neutral position N is a space between the small first speed gear 175 and the reverse speed sprocket 181, whereby the keys 183 and 185 may be disposed in such space so that none of the gears to the left of the sprocket 181 is fixed to the shaft 130.

Considering now in greater detail the fixed reduction gear train 141 as shown in the drawings, the train 141 includes a small gear 200 fixed to the shaft 130 adjacent the sprocket 181 to drive a large gear 202 freely mounted for rotation on the shaft 134, whereby when the keys 183 and 185 are disposed in one of the forward speed positions or in the reverse speed position, the shaft 130 driven by the forward shifting range gear train 138 drives the fixed gear 200 and thus the fixed reduction gear train 141. A small gear 204 is integral with the large gear 202 and meshes with a large gear 206 mounted freely about the shaft 130. A small or pinion gear 208 is integral with the large gear 206 and meshes with a large gear 210 having an integral small or pinion gear 212 which in turn meshes with a large gear 214 freely mounted for rotation about the shaft 130. A smaller pinion gear 216 is integral with the large gear 214 and meshes with a gear housing 218 of the differential 128 so that a pair of internal bevel gears 221 and 223 drive the respective shafts 124 and 126. A brake member 225 cooperates with another brake member (not shown) for controlling the output of the transmission 118.

Referring now to FIG. 4 of the drawings, there is shown a mechanical transmission apparatus 227, which is constructed in accordance with the present invention and which is similar to the transmission apparatus 118 of FIG. 3 except that an additional shaft is employed and a different type of shifting device is employed. The transmission apparatus 227 is in the form of a transaxial and generally comprises a housing 229 having a transaxial generally indicated at 231 journaled for rotation within the housing 229, the transaxial 231 including a left shaft 233 co-axially aligned with a right shaft 235 and being joined together by a differential 237 in a manner similar to the transaxial of the apparatus 118 of FIG. 3. An input and gear shift shaft 239 is mounted within the interior of the housing 229 and serves as an input to the transmission apparatus 227 as well as enabling the transmission apparatus 227 to be shifted through a number of speeds as hereinafter described in greater detail. An intermediate shaft 240 is disposed between the shaft 239 and the transaxial 231 in a spaced-apart parallel manner for supporting together with the shaft 239 a fixed reduction gear train 242. A forward shifting range gear train 244 is supported by the intermediate shaft 240 and the shaft 233 of the transaxial 231 as hereinafter described in greater detail. A large fixed gear 246 is pinned to the input shaft 239 and is driven thereby to in turn drive a large idler gear 248 freely mounted for rotation on the intermediate shaft 240, whereby the idler gear 248 is integrally connected to a small or pinion gear 250 which in turn meshes with a gear housing 252 of the differential 237. The differential 237 is a conventional differential and includes a pair of internal bevel gears 254 and 256 which are fixed to the respective shafts 233 and 235 for driving them independently of one another. A brake member 258 is integral with the housing of the differential 237 and is mounted externally of the transmission housing 227 to cooperate with another brake member (not shown) for braking purposes.

Considering now the fixed reduction gear train 242 in greater detail with reference to FIG. 4 of the drawings, a large outside input gear 251 or the like input device is journaled for rotation about a portion of the input shaft 239 extending on the outside of the housing 227 and is integrally connected to a small inside input gear 253, whereby a source of power (not shown) may be connected drivingly to the outside input gear 251 for driving the transmission apparatus 227. A large gear 255 is freely mounted for rotation on the intermediate shaft 240 and meshes with the small inside input gear 253. The fixed reduction gear train 242 includes a first set of axially aligned gears arranged in pairs of fixedly connected together gears mounted on the input shaft 239, and a second set of axially aligned gears arranged in pairs of fixedly connected together gears, whereby each pair of the first set of gears intermesh with a corresponding one of the pairs of the second set of axially aligned gears in a manner similar to the fixed reduction gear train 141 of the transmission apparatus 118 of FIG. 3 of the drawings. A small last gear 257 of the fixed reduction gear train 242 is freely mounted for rotation about the intermediate shaft 240 to mesh with a large gear 259 mounted freely on the shaft 233 of the transaxial 231, the gear 259 being the third speed gear of the forward shifting range gear train 244. The forward shifting range gear train 244 is similar to the shifting range gear train 138 of the apparatus 118 of FIG. 3 in that the gear train 244 comprises two sets of pairs of fixedly connected together gears mounted on the pair of parallel spaced-apart shafts 240 and 233.

Considering now in greater detail the forward shifting range gear train 244, the gear train 244 includes the large gear 259 which has integrally connected thereto a small or pinion gear 261 which is freely mounted for rotation about the shaft 233 and which meshes with a large gear 263 mounted for free rotation about the shaft 240. A shiftable gear 265 is mounted on the input shaft 239 and is transversely shiftable along an elongated keyway 266 to selectively engage certain ones of the gears of the gear train 244 so as to select different speeds for the transmission apparatus 227. A gear shift device (not shown) is fixed to the shiftable gear 265 and extends through an opening 267 to shift the gear 265 along the shaft 239. For example, as shown in FIG. 4 of the drawings, when the shiftable gear 265 is disposed in the leftwardmost position it meshes with the gear 263 and thus operates in the third speed for the transmission apparatus 227 for conveying power to the fixed gear 246 and thence to the shaft 233 and 235.

An integral small or pinion gear 269 surrounding the intermediate shaft 240 fixed to the gear 263 meshes with a large gear 271 freely mounted about the left shaft 233. A small or pinion gear 273 is fixed to or integral with the large gear 271 and meshes with a large gear 275 mounted freely about the intermediate shaft 240 to form the second speed for the transmission 227. A small or pinion gear 277 is integral with the gear 275 and meshes with a large gear 279 mounted freely about the shaft 233. A small or pinion gear 282 is fixed to the large gear 279 and meshes with a large gear 284 mounted for free rotation about the intermediate shaft 240 to form the first speed for the transmission apparatus 227 when the gear 265 meshes with the gear 284. A small or pinion gear 286 is integral with the gear 284 and is mounted for free rotation about the intermediate shaft 240 to mesh with a large gear 288 which is mounted for free rotation about the shaft 233, and which is fixedly connected to a sprocket 290 which is connected drivingly by means of a belt or chain (not shown) to a second sprocket 292 mounted for free rotation about the shaft 240 and fixed to a large reverse gear 294. In this regard, when the shiftable gear 265 is disposed in the position indicated by the reference character R, the gear 265 meshingly engages the reverse gear 294 for driving the shafts 233 and 235 in a reverse direction in a manner similar to the reverse speed for the transmission apparatus 228 of FIG. 3. Also, in a similar manner to the transmission apparatus 118 of FIG. 3, there is a neutral position N disposed between the sprocket 292 and the small gear 286 to receive the shiftable gear 265 to serve as a neutral position, whereby the power coupled to the shaft 239 is not transmitted to the shaft 233 and 235. The shiftable gear 265 is attached to the shaft 239 in such a manner that there are a few degrees of freedom in the radial direction to simplify shifting interference while shifting from 3 to R through 2 and N.

Referring now to FIG. 5 of the drawings, there is shown a transmission apparatus 296, which is constructed in accordance with the present invention and which is similar to the transmission apparatus 227 of FIG. 4 except that the apparatus 296 has an auxiliary power takeoff shaft and is a nine speed transmission for both the main output shaft and the auxiliary power takeoff shaft. The transmission apparatus 296 generally comprises a housing 298 having an input and gear shift shaft 300 journaled for rotation therein in a similar manner as the shaft 239 is employed in the transmission apparatus 227 of FIG. 4. A main output shaft 302 is also journaled for rotation within the housing 298 and extends in a parallel spaced-apart manner relative to the input shaft 300. An intermediate shaft 304 is fixedly mounted within the interior of the housing 298 between the shafts 300 and 302 in a parallel spaced-apart manner. An auxiliary power takeoff shaft 306 is journaled for rotation within the housing 298 spaced from and parallel to the main output shaft 302. A forward shifting range gear train 308 is similar to the shifting range gear train 244 of the transmission apparatus 227 for enabling the main output shaft 302 and the auxiliary power takeoff shaft 306 to operate at different selected speeds relative to the speed of the input shaft 300. In this regard, the input shaft 300 is adapted to be connected to a source of power (not shown), and the main output shaft 302 and the auxiliary power takeoff shaft 306 are adapted to be coupled to separate loads (not shown), whereby the power source can drive both of the loads at different speeds and employing gear reductions by employing the transmission apparatus 296 of the present invention.

A small gear 311 is pinned to the input shaft 300 and meshes with a large idler gear 313 freely mounted for rotation about the shaft 304, whereby an integral small pinion gear 315 fixed to the large gear 313 meshes with a large output gear 317 fixed to the main output shaft 302. A brake member 319 is integrally fixed to the gear 317 surrounding the shaft 302 externally of the housing 298 to cooperate with another brake member (not shown) for braking purposes.

Considering now the gear train 308 in greater detail with reference to the drawings, a large outside input gear 321 is disposed externally of the housing 298 surrounding the input shaft 300, the input gear 321 being mounted freely for rotation about the input shaft 300 and being integral with a small inside gear 323 freely surrounding the input shaft 300 within the interior of the housing 298. A large gear 325 mounted for free rotation about the intermediate shaft 304 meshes with the gear 323, and is integral with a small or pinion gear 327 which in turn meshes with a large gear 328 mounted freely about the main output shaft 302. The gear train 308 includes gears 328 through the last large gear 360 and are arranged in two sets of gears, the first set of gears being pairs of fixedly connected together gears mounted on the intermediate shaft 304 and the second set being mounted on the main output shaft 302 in a manner similar to the gear train 244 of the transmission apparatus 227 of FIG. 4. A sprocket 361 is fixed to the gear 360 and drives by means of a belt or chain (not shown) a second or reverse sprocket 362 which is fixed to a reverse gear 363 in a similar manner as the reverse gear 292 of the transmission apparatus 227.

A shiftable gear 364 mounted with a keyway slot or spline 365 on the input shaft 300 is similar to the shiftable gear 265 of the transmission apparatus 227 and cooperates with the large gears mounted on the intermediate shaft 304 to provide eight forward speeds and one reverse speed for the main output shaft 302, a neutral position N being a space for receiving the gear 364 between the small gear 359 and the sprocket 362 both mounted on the shaft 304 in a manner similar to the neutral position of the transmission 227 of FIG. 4.

A shiftable gear 368 is slidably mounted on the auxillary power takeoff shaft 306 by means of an elongated keyway slot 369 to mesh with the large gears of the gear train 308 mounted on the main output shaft 302 to provide nine forward speeds for the auxiliary power takeoff shaft 306. In the position illustrated in FIG. 5 of the drawings, the gear 368 is shown meshing with a large gear 344 mounted for free rotation about the shaft 302. In that position, the auxiliary power takeoff shaft 306 is driven in a fifth speed relative to the speed of the input shaft 300. It should be understood by those skilled in the art that both of the shiftable gears 364 and 368 may be shifted in any convenient manner such as the manner suggested for the shiftable gear 265 of the transmission apparatus 227 of FIG. 4.

It will become apparent to those skilled in the art that many different modifications may be made in the embodiments of the invention disclosed herein, and therefore it is intended to be limited by only the true spirit and scope of the appended claims. In this regard, many different applications for the transmission apparatus of the present invention will become apparent to those skilled in the art.

What is claimed is:

1. Mechanical transmission apparatus for coupling drivingly a source of mechanical power to a load, comprising:
    a housing;
    first and second shaft means mounted in said housing;
    a gear train including a plurality of gears mounted on said first and second shaft means, said gear train including a first set of axially aligned gears arranged in pairs of fixedly connected together gears, and a second set of axially aligned gears arranged in pairs of fixedly connected together gears, each pair of said first set of gears intermeshing with corresponding pairs of said second set of axially aligned gears to form a gear train, one of said pairs of gears being freely rotatable on said first shaft means, each one of the pairs of gears including a large gear and a small gear, each one of said large gears having substantially the same number of teeth and each one of said small gears having substantially the same number of teeth, certain ones of said gears on one of said shaft means being adapted to serve as speed shift gears;
    means for coupling the source of power to one of said pairs of gears of said gear train;
    means for coupling power drivingly to the load; and
    a single shifting member movably mounted directly on one of said first and second shaft means for conveying power selectively from the source of power via said gear train through a selected one of said speed shift gears of said gear train to one of said shaft means to cause it to be driven at a selected one of a plurality of speeds and thus to cause the load to be driven at a selected one of a plurality of speeds, whereby power is transmitted from the source through said gear train to the load.

2. Mechanical transmission apparatus according to claim 1, wherein said means coupled to the load includes a transaxle having right and left shafts and differential means interconnecting said right and left shafts in axial alignment with one another.

3. Mechanical transmission apparatus according to claim 1, wherein said shifting means includes a longitudinally movable gear and an elongated key mounted fixedly on said second shaft means.

4. Mechanical transmission apparatus according to claim 1, wherein speed shift gear train means includes a reverse gear and a neutral position.

5. Mechanical transmission apparatus according to claim 1, further including a third shaft for supporting said means for coupling power drivingly to the load.

6. Mechanical transmission apparatus according to claim 1, wherein said speed shift gear train means includes a key shifting means for engaging selectively one of the speed shift gears.

7. Mechanical transmission apparatus according to claim 1, wherein said speed shift gear train means includes a shiftable gear for meshing selectively with one of the speed shift gears.

* * * * *